US006637556B1

(12) United States Patent
Lun

(10) Patent No.: US 6,637,556 B1
(45) Date of Patent: Oct. 28, 2003

(54) MAGNETO-RHEOLOGICAL DAMPER WITH GROOVED FLUID PASSAGES

(75) Inventor: Saiman Lun, Centerville, OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/212,597

(22) Filed: Aug. 5, 2002

(51) Int. Cl.[7] ................................. F16F 15/03
(52) U.S. Cl. ....................................... 188/267
(58) Field of Search .................. 188/267, 267.1–267.2; 267/140.11–140.15

(56) References Cited

U.S. PATENT DOCUMENTS 5,259,487 A * 11/1993 Petek .......................... 188/267
5,277,281 A    1/1994 Carlson et al.
6,260,675 B1 * 7/2001 Muhlenkamp ............... 188/267
6,279,700 B1 * 8/2001 Lisenker et al. ........... 188/267.1
6,360,856 B1 * 3/2002 Koh .......................... 188/267.1

* cited by examiner

Primary Examiner—Christopher P. Schwartz
(74) Attorney, Agent, or Firm—Scott A. McBain

(57) ABSTRACT

Performance of a vehicle damper utilizing a Magneto-Rheological (MR) fluid is enhanced through use of a piston having grooves in the walls of a magnetic flux path portion of a fluid flow passage through the piston. The grooves result in a focusing and intensification of the magnetic flux emanating from the corners of the grooves, to thereby intensify the magnetic flux impressed across the fluid flow passage and cause a greater degree of change in viscosity of the MR fluid flowing through the passage than is achievable in prior MR dampers having smooth-walled fluid flow passages.

20 Claims, 3 Drawing Sheets

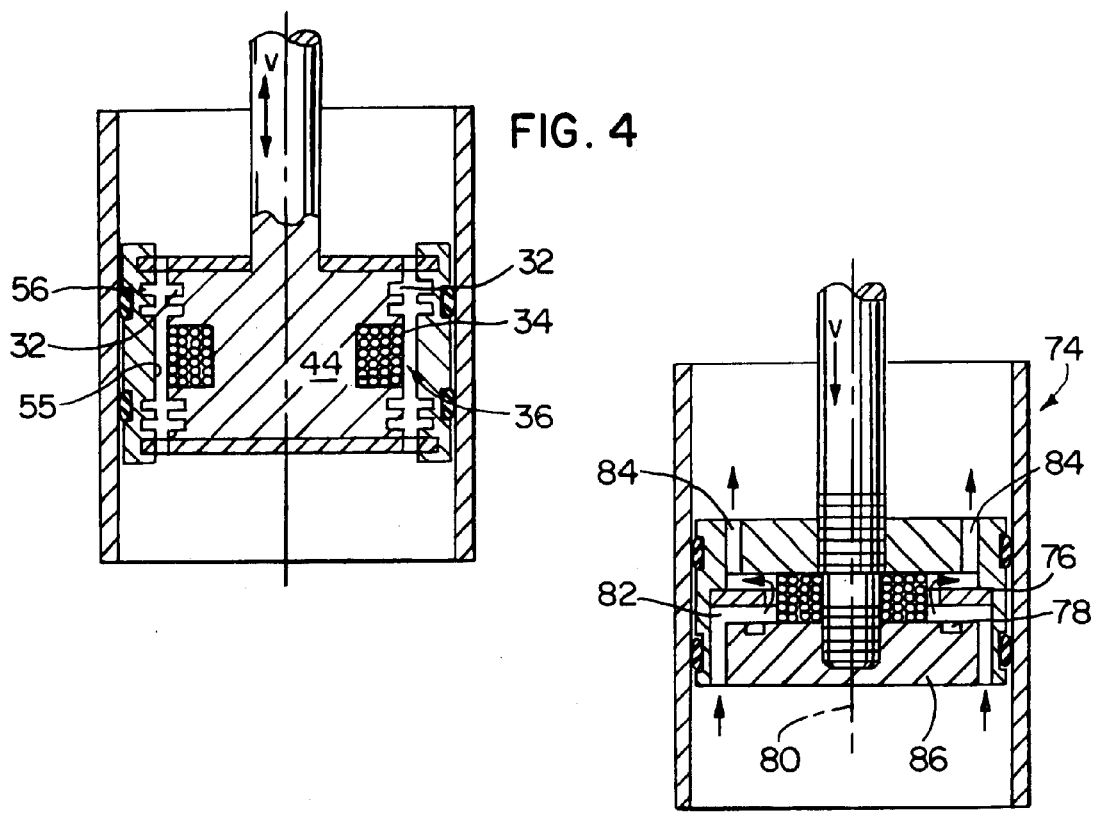
FIG. 4
FIG. 7
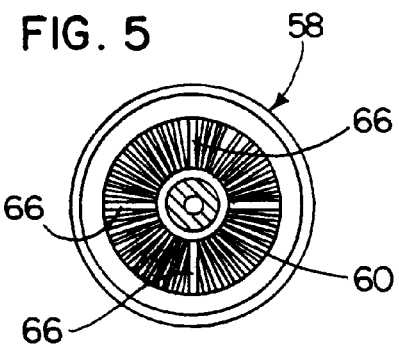
FIG. 5
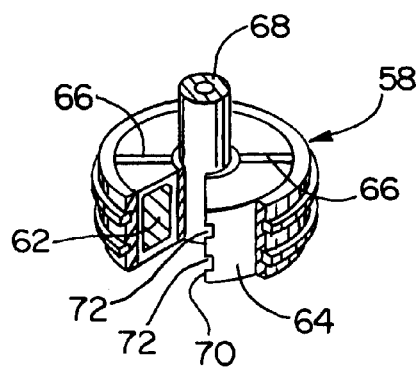
FIG. 6

MAGNETO-RHEOLOGICAL DAMPER WITH GROOVED FLUID PASSAGES

TECHNICAL FIELD OF THE INVENTION

This invention relates to a damper adapted for use in a vehicle suspension system, and more particularly to a hydraulic damper utilizing a Magneto-Rheological fluid.

BACKGROUND OF THE INVENTION

Dampers, such as shock absorbers and MacPherson struts have been used for many years in vehicle suspension systems for dissipating energy and reducing undesirable road inputs that would otherwise be transferred to the vehicle body and the associated passenger compartment. In recent years, hydraulic dampers using a special type of fluid, known as Magneto-Rheological (MR) fluid, have been utilized as part of vehicle traction and stability enhancement control systems, for actively controlling the amount of damping provided under varying road and operating conditions, to provide improved performance and safe operation of vehicles.

As shown in FIG. 1, in the past, one form of Magneto-Rheological (MR) dampers 10 has typically included a piston 12 that is movable within a working chamber 14 of a cylinder 16 containing the MR fluid. The cylinder 16 is attached to one part of the suspension, and a piston rod 18 extending from the piston 12 and out of the cylinder16 is attached to another part of the vehicle suspension.

The piston 12 of the MR damper 10 separates the working chamber 14 into a compression chamber 20 and a rebound chamber 22. The piston 12 is equipped with a sliding fluid seal 24 that prevents leakage of the fluid around the piston 12, between the piston 12 and the cylinder 16. The piston 12 also includes one or more smooth-walled flow passages 26 extending though the piston 12 that allow the MR fluid in the working chamber 14 to move between the compression and rebound chambers 20,22, as the piston rod 18 and piston 12 are moved in relation to the cylinder 16 of the damper 10 by movement of the vehicle suspension. The flow passages 26 extending through the piston 12 are sized to restrict the flow of MR fluid through the piston 12, thereby limiting the rate at which the piston 12 can move within the cylinder 16 to be a function of how rapidly the MR fluid can pass through the flow passages 26.

The MR fluid has microscopic particles of a magnetic material suspended in a liquid carrier. When the MR fluid is exposed to a magnetic field of sufficient strength, the suspended particles align with the magnetic field and cause a change in the viscosity of the MR fluid. As the viscosity of the MR fluid changes, the rate at which the MR fluid can flow through the flow passages 26 in the piston 12 is also changed, thereby causing the amount of damping to be changed in a direct relationship to the viscosity of the MR fluid flowing through the flow passages 26.

In one form of MR damper 10, the piston 12 includes an electromagnetic coil 28 oriented within the piston 12 to generate an electromagnetic field acting across one or more of the flow passages 26 in the piston 12. By controlling the electrical current to the electromagnetic coil 28, the viscosity of the MR fluid within the flow passages 26 can be changed to adjust the amount of damping provided to meet the operational requirements of the damper 10 for various vehicle operating conditions, resulting in continuously variable real time damping. U.S. Pat. No. 5,277,281 to Carlson, et at, discloses a number of specific embodiments of MR dampers of the type described above.

The change in viscosity of the MR fluid that can be attained in an MR damper 10 of the type described above, and the resulting change in damping provided by the damper 10, are directly related to the intensity of the magnetic flux within the flow passages 26 of the piston 12. It is therefore desirable that the MR damper 10 be designed to provide efficient and effective conversion of the electrical current applied to the electromagnetic coil 28 to produce an optimal strength magnetic field.

SUMMARY OF THE INVENTION

My invention provides an improved MR damper through the use of a piston having judiciously placed grooves in the walls of a magnetic flux path portion of a fluid flow passage through the piston. The grooves result in a focusing and intensification of the magnetic flux emanating from corners of the grooves, to thereby intensify the magnetic flux impressed across the fluid flow passage and cause a greater degree of change in viscosity of the MR fluid flowing through the passage than is achievable in prior MR dampers having smooth-walled fluid flow passages.

In one form of my invention a vehicle damper includes a cylinder tube and a reciprocating piston slidably disposed in the working chamber. The cylinder tube defines an axis and a working chamber extending along the axis for containing a magneto-rheological (MR) fluid therein. The piston includes a first and a second face and a fluid passage extending through the piston from the first to the second face for directing a flow of MR fluid along a flow direction through the flow passage as the piston reciprocates in the working chamber. The piston has an electromagnetic element defining a wall forming a magnetic flux path portion of the fluid flow passage. The wall includes a groove therein extending in a direction generally transverse to the flow direction through the magnetic flux path portion of the fluid flow passage, to thereby intensify a magnetic flux passing through the magnetic flux path portion of the fluid flow passage.

The foregoing and other features and advantages of my invention are apparent from the following detailed description of exemplary embodiments, read in conjunction with the accompanying drawings. The detailed description and drawings are merely illustrative of the invention rather than limiting, with the scope of the invention being defined by the appended claims and equivalents thereof.

BRIEF DESCRIPTION OF THE DRAWINGS

FIG. 4 is a partial cross section of a damper piston having passages for the flow of MR fluid through the piston defined by a magnetic core and a flux ring spaced radially outward about the core, with grooves in a wall of both the core and the flux ring;

FIGS. 5 and 6 are an orthographic and a perspective view respectively of another embodiment of a piston according to my invention, having grooves in the facing ends of spaced electromagnetic core segments; and FIG. 7 is a cross-sectional view of another exemplary embodiment of a vehicle damper, according to my invention, having annular axially opening grooves in wall of a radially extending portion of a flow passage.

DETAILED DESCRIPTION OF THE PRESENTLY PREFERRED EMBODIMENTS

Figure 2:
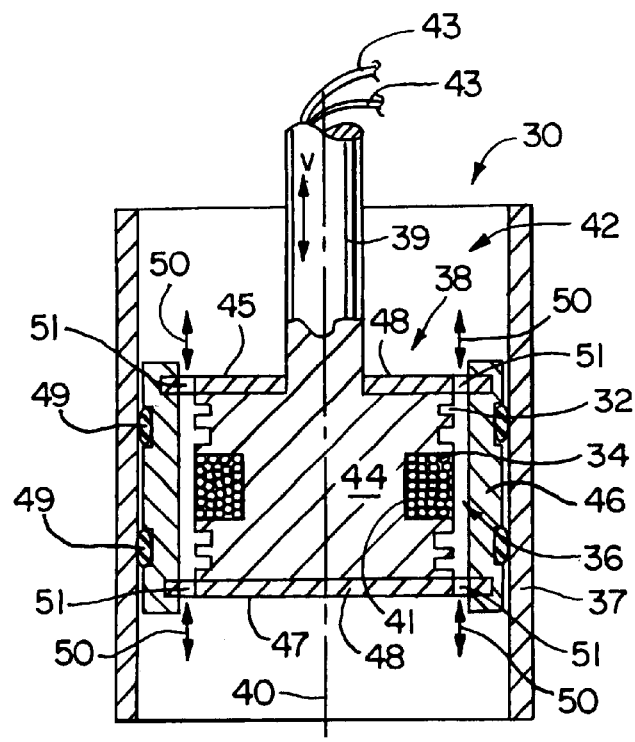
FIG. 2 is a cross sectional representation of an exemplary embodiment of an MR damper, according to my invention, having grooves in the walls of passages extending through a piston of the damper for passage of the MR fluid.

FIG. 2 depicts an exemplary embodiment of an MR damper 30, according to my invention, having grooves 32 in the walls 34 of passages 36 extending through a piston 38 of the damper 30 for passage of the MR fluid. The damper 30 includes a cylinder tube 37 defining an axis 40 and a working chamber 42 extending along the axis 40 for containing a magneto-rheological (MR) fluid therein. The piston 38 is attached to a piston rod 39 and slidably disposed for reciprocating motion along the axis 40 in the working chamber 42.

The piston 38 is in the form of a piston body formed by a magnetic core 44, a flux ring 46, and a pair of retainers at both axial ends of the core 44. The retainers 48 are preferably fabricated from a non-magnetic material, such as aluminum, non-magnetic stainless steel, plastic, or composite materials. Magnetic materials may be used for the retainers 48, but are not preferred because a portion of the magnetic flux will be "short-circuited" through a magnetic retainer, rather than traveling across the magnetic gap formed by the flow passages 36, and will not be available for activating the MR fluid.

The magnetic core 44 is disposed about the axis 40 within the piston body, and is adapted for receiving a coil 41, that is connectable to a source of electrical current via electrical leads 43 passing through the piston rod 39, for generating a magnetic flux field emanating from the core 44. The radially outer cylindrical wall 34 of the core 44 defines four circumferential annular grooves 32 therein. The upper and lower faces of the piston 12, as shown in FIG. 2, define 44 a first and a second axial face 45, 47 of the piston 38.

The flux ring 46 is disposed within the piston body about the core 44 in a circumferentially spaced relationship thereto, to form the annular fluid passage 36 between the core 44 and the flux ring 46 for directing a bi-directional flow of MR fluid through the fluid passage 36 in a flow direction indicated by arrows 50 extending generally parallel to the axis 40, as the piston 12 reciprocates in the working chamber 42. The retainers 48 include a series of openings 51 aligned with the fluid passage 36, to allow the MR fluid to pass through the retainers and the fluid passage 36. The flux ring 46 includes a pair of sliding seals 49 to prevent flow of the MR fluid around the outside of the piston 12.

The core 44 and flux ring 46 in combination define a magnetic flux path portion of the fluid flow passage 36, for directing the magnetic flux generated by the coil 41 through the fluid flow passage 36 in a direction generally transverse to the flow direction 50 of the MR fluid passing through the passage 36, as the piston 12 reciprocates in the working chamber 42. The corners of the four annular grooves 32 in the wall 34 are relatively sharp, and tend to cause the flux that would otherwise pass through the area of the wall 34 occupied by the grooves 32 to concentrate and intensify at the corners of the grooves 32, to thereby intensify the magnetic flux passing through the magnetic flux path portion of the fluid flow passage 36.

Figure 1:
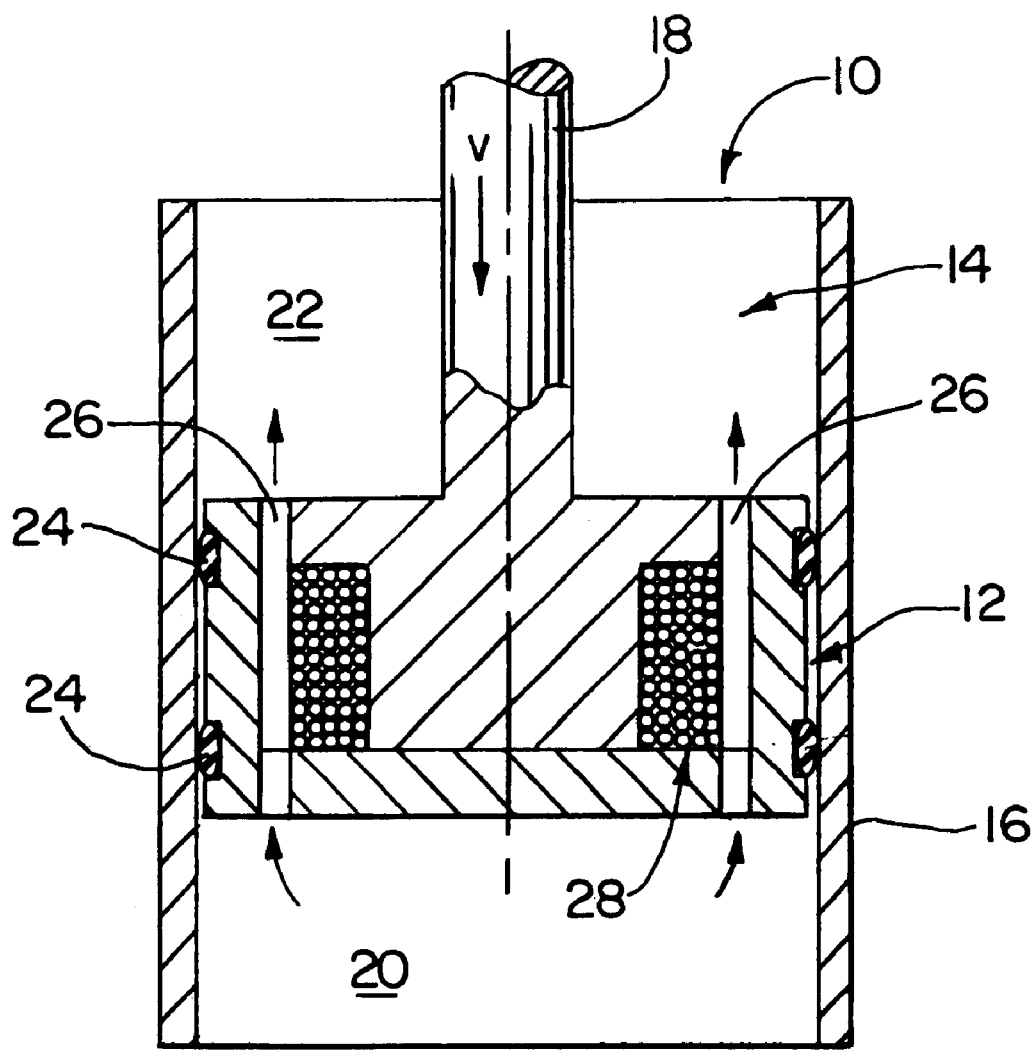
FIG. 1 is a cross sectional representation of a prior art MR damper, having smooth-walled passages extending through a piston of the damper for passage of the MR fluid.
Figure 3:
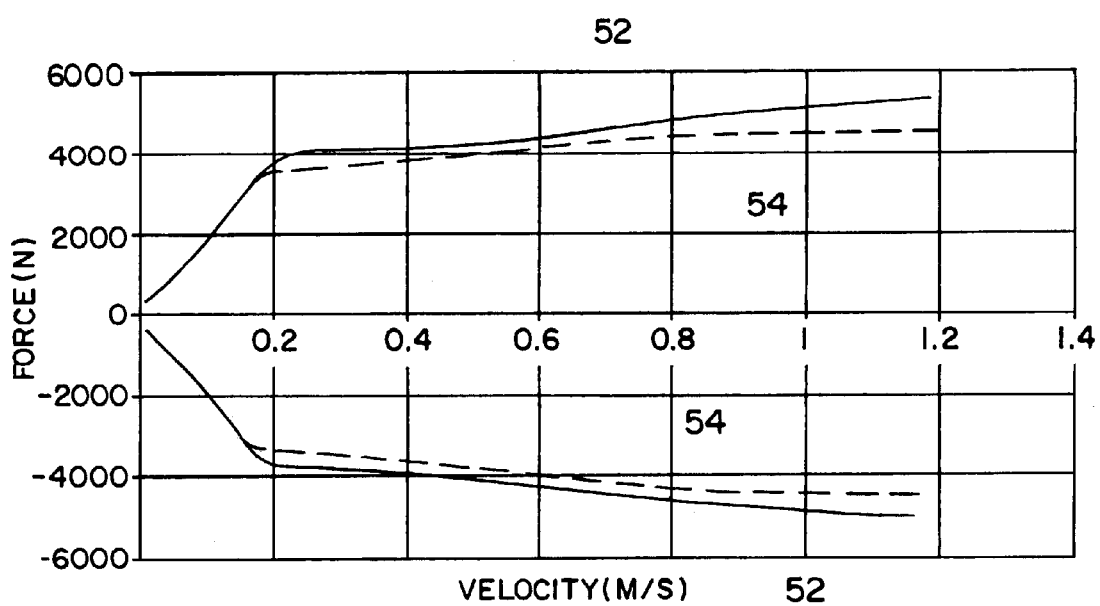
FIG. 3 is a graph illustrating the improved performance of a damper having grooved walls in the flow passages according to my invention, as compared to a prior art damper having smooth walled flow passages.

As shown in FIG. 3, the intensified magnetic flux emanating from the core 44 at the corners of the grooves 32 causes a bigger change in viscosity of the MR fluid flowing through the passage 36 while the coil 41 is energized, than would be the case without the grooves 32 in the wall 34 of the core 44. The curves labeled with reference number 52 in FIG. 3 illustrates performance of an MR damper 30 having grooved walls 34, according to my invention, as described above, as compared to the performance shown by the curves labeled with reference number 54 for a prior damper of similar size and construction but having smooth-walled fluid flow passages, such as those illustrated in FIG. 1.

FIG. 4 depicts a second exemplary embodiment of my invention 20 wherein the inner wall 55 of flux ring 46 includes one or more annular circumferential grooves 56 in the therein opening toward the core 44, and aligning with one or more of the one or more grooves 32 in the core 44. I contemplate that various embodiments of my invention may include grooves in only the core 44, only the flux ring 46, or in both the core 44 and the flux ring 46, according to the operational requirements of a particular damper 30.

FIGS. 5 and 6 depict a third exemplary embodiment of a piston58, for a damper according to my invention, having a coil 60 toroidally wound about a core element 62, in which the core element is made up of four segments 64. The coil 60 encompasses all four segments 64, with the terminal wire of the coil 60 wound around one core segment 64, initiating the winding about the adjacent segment 64. The segments 64 are spaced from one another to form four slots 66 which extend axially through the piston 58 and radially outward from the piston rod 68. Adjacent facing walls 70 of the segments 64 extend generally parallel to the axis of the piston rod 68, and include radially oriented grooves 72 extending transversely to the direction of flow of MR fluid through the four slots 66.

FIG. 7 is a cross-sectional view of a fourth exemplary embodiment of a vehicle damper 74, according to my invention, having annular, axially opening grooves 76 in wall 78 facing transversely and perpendicularly to an axis 80 the damper 74, in a radially extending portion 82 of a convoluted flow passage 84 through a piston 86.

While the embodiments of my invention disclosed herein are presently considered to be preferred, various changes and modifications can be made without departing from the spirit and scope of the invention. The scope of the invention is indicated in the appended claims, with all changes or modifications within the meaning and range of equivalents being embraced by the claims.

I claim:

1. A piston adapted for reciprocating motion along an axis within a working chamber containing a magneto-rheological (MR) fluid therein of a cylinder tube of a damper, the piston comprising:

a piston body defining a first and a second face and a fluid flow passage extending through the piston from the first to the second face for directing a flow of MR fluid along a flow direction through the fluid flow passage as the piston reciprocates in the working chamber; and an electromagnetic element within the piston body defining a wall forming a magnetic flux path portion of the fluid flow passage for directing magnetic flux through the wall and the fluid flow passage in a direction generally transverse to the flow direction, the wall including a groove therein extending in a direction generally transverse to the flow direction through the magnetic flux path portion of the fluid passage for intensifying the magnetic flux passing in a direction transverse to the flow direction through the wall and the magnetic flux path portion of the fluid flow passage.

2. The piston of claim 1 wherein the piston body is adapted for connection to a piston rod of the damper, the piston rod having a first and a second end, the first end adapted for connection to the piston body for linear movement of the rod and piston within the working chamber along the axis, the second end of the piston rod extending along the axis and out of the working chamber.

3. The piston of claim 1 wherein the wall forming the magnetic flux path portion of the fluid flow passage extends in a direction parallel to the axis.

4. The piston of claim 1 wherein the wall forming the magnetic flux path portion of the fluid flow passage extends in a direction perpendicular to the axis.

5. The piston of claim 1 wherein the wall forming the magnetic flux path portion of the fluid flow passage extends in a direction transverse to the axis.

6. The piston of claim 1 wherein the wall forming the magnetic flux path portion of the fluid flow passage includes a cylindrical portion thereof disposed about and extending in a direction substantially parallel to the axis.

7. The piston of claim 6 wherein groove forms an annulus in the wall.

8. The piston of claim 1 wherein the groove defines a sharp corner of the wall.

9. The piston of claim 1 wherein the piston body comprises:
   a magnetic core disposed about the axis, adapted for receiving a coil, and having a radially outer cylindrical wall thereof defining one or more circumferential annular grooves;
   a coil attached to the core for generating a magnetic flux field emanating from the core; and
   a flux ring disposed about the core in a spaced relationship from the radially outer cylindrical wall of the core, to form an annular fluid passage between the core and the flux ring for directing a flow of MR fluid along a flow direction through the fluid passage as the piston reciprocates in the working chamber;
   the core and flux ring defining a magnetic flux path portion of the fluid flow passage, with the one or more grooves extending in a direction generally transverse to the flow direction through the magnetic flux path portion of the fluid flow passage, to thereby intensify the magnetic flux passing through the magnetic flux path portion of the fluid flow passage.

10. The piston of claim 9 wherein the flux ring includes one or more annular circumferential grooves therein opening toward the core and aligning with one or more of the one or more grooves in the core.

11. A damper comprising:
   a cylinder tube defining an axis and a working chamber extending along the axis for containing a magnetorheological (MR) fluid therein; and
   a reciprocating piston slidably disposed in the working chamber and including a first and a second face and a fluid flow passage extending through the piston from the first to the second face for directing a flow of MR fluid along a flow direction through the fluid flow passage as the piston reciprocates in the working chamber;
   the piston having an electromagnetic element defining a wall forming a magnetic flux path portion of the fluid flow passage for directing magnetic flux through the wall and the fluid flow passage in a direction transverse to the flow direction, the wall including a groove therein extending in a direction generally transverse to the flow direction through the magnetic flux path portion of the fluid flow passage for intensifying the magnetic flux passing in a direction transverse to the flow direction through the wall and the magnetic flux path portion of the fluid flow passage.

12. The damper of claim 11 further including a piston rod having a first and a second end, the first end connected to the piston for linear movement of the rod and piston within the working chamber along the axis, the second end of the piston rod extending along the axis and out of the working chamber.

13. The damper of claim 11 wherein the wall forming the magnetic flux path portion of the fluid flow passage extends in a direction parallel to the axis.

14. The damper of claim 11 wherein the wall forming the magnetic flux path portion of the fluid flow passage extends in a direction perpendicular to the axis.

15. The damper of claim 11 wherein the wall forming the magnetic flux path portion of the fluid flow passage extends in a direction transverse to the axis.

16. The damper of claim 11 wherein the wall forming the magnetic flux path portion of the fluid flow passage includes a cylindrical portion thereof disposed about and extending in a direction substantially parallel to the axis.

17. The damper of claim 11 wherein groove forms an annulus in the wall.

18. The damper of claim 11 wherein the groove defines a sharp corner of the wall.

19. A damper comprising:
   a cylinder tube defining an axis and a working chamber extending along the axis for containing a magnetorheological (MR) fluid therein; and
   a reciprocating piston slidably disposed in the working chamber and including a piston body defining a first and a second axial face of the piston;
   a magnetic core disposed about the axis within the piston body, adapted for receiving a coil, and having a radially outer cylindrical wall thereof extending axially beyond the coil and defining one or more circumferential annular grooves therein;
   a coil attached to the core for generating a magnetic flux field emanating from the core; and
   a flux ring disposed within the piston body about the core in a spaced relationship thereto, to form an annular fluid passage between the radially outer cylindrical wall of the core and the flux ring for directing a flow of MR fluid through the fluid passage in a flow direction generally parallel to the axis as the piston reciprocates in the working chamber;
   whereby the core and flux ring in combination define a magnetic flux path portion of the fluid flow passage for directing magnetic flux through the cylindrical wall and the fluid flow passage in a direction transverse to the flow direction, with the one or more grooves in the core extending in a direction generally transverse to the flow direction through the magnetic flux path portion of the fluid flow passage for intensifying the magnetic flux passing in a direction transverse to the flow direction through the cylindrical wall and the magnetic flux path portion of the fluid flow passage.

20. The damper of claim 19 wherein the flux ring includes one or more annular circumferential grooves therein opening toward the core and aligning with one or more of the one or more grooves in the core.

* * * * *